United States Patent
Pereyra-Garcia Bustamante

(10) Patent No.: US 11,173,830 B2
(45) Date of Patent: Nov. 16, 2021

(54) DECORATIVE COVER FOR MOTOR VEHICLE WHEELS HAVING ACTIVE LIGHTING

(71) Applicant: Demmel AG, Scheidegg (DE)

(72) Inventor: Daniel Miguel Pereyra-Garcia Bustamante, Lindenberg (DE)

(73) Assignee: DEMMEL AG, Scheidegg (DE)

( * ) Notice: Subject to any disclaimer, the term of this patent is extended or adjusted under 35 U.S.C. 154(b) by 0 days.

(21) Appl. No.: 16/788,694

(22) Filed: Feb. 12, 2020

(65) Prior Publication Data
US 2020/0254923 A1 Aug. 13, 2020

(30) Foreign Application Priority Data
Feb. 12, 2019 (DE) .................. 10 2019 103 393.4

(51) Int. Cl.
| | |
|---|---|
| *F21V 3/02* | (2006.01) |
| *B60Q 1/32* | (2006.01) |
| *B60Q 1/26* | (2006.01) |
| *B60B 7/06* | (2006.01) |
| *F21V 23/02* | (2006.01) |
| *F21S 9/04* | (2006.01) |
| *F21W 104/00* | (2018.01) |

(52) U.S. Cl.
CPC .............. *B60Q 1/326* (2013.01); *B60B 7/061* (2013.01); *B60Q 1/2661* (2013.01); *F21S 9/04* (2013.01); *F21V 3/02* (2013.01); *F21V 23/02* (2013.01); *F21W 2104/00* (2018.01)

(58) Field of Classification Search
None
See application file for complete search history.

(56) References Cited

U.S. PATENT DOCUMENTS

| | | |
|---|---|---|
| 4,775,919 A | 10/1988 | Pearsall et al. |
| 4,782,431 A | 11/1988 | Park |
| 4,881,153 A | 11/1989 | Scott |
| 4,893,877 A | 1/1990 | Manual et al. |
| 4,929,030 A | 5/1990 | Park |
| 6,016,101 A | 1/2000 | Brown |
| 7,079,042 B2 | 7/2006 | Reim |
| 2006/0044817 A1* | 3/2006 | Terry .............. B60B 7/006 362/500 |
| 2018/0301035 A1 | 10/2018 | Toshio |

FOREIGN PATENT DOCUMENTS

| | | |
|---|---|---|
| DE | 102017211695 A1 | 1/2019 |
| GB | 2409440 A | 6/2005 |

* cited by examiner

*Primary Examiner* — Vip Patel
(74) *Attorney, Agent, or Firm* — Browdy and Neimak, PLLC

(57) ABSTRACT

A decorative cover for motor vehicle wheels, which is detachably arranged in the space between spokes of a motor vehicle rim, wherein the decorative cover has active lighting, the electrical energy of which can be generated by an energy module fastened to the rear of the decorative cover, wherein the energy generation thereof works independently of the fixed components of the motor vehicle.

9 Claims, 4 Drawing Sheets

DECORATIVE COVER FOR MOTOR VEHICLE WHEELS HAVING ACTIVE LIGHTING

The invention relates to a decorative cover for motor vehicle wheels having active lighting, which is detachably arranged in a space between spokes of a motor vehicle rim.

In the case of the subject matter of DE 10 2017 211 695 A1, a wheel of a vehicle is known in which a decorative cover comprises a wing portion which can be shifted into at least a first and a second position depending on the temperature.

This decorative cover (called cover element there) is fastened to a spoke of a motor vehicle rim by means of at least one fastening element.

The use of such an approximately sector-shaped decorative cover, which is detachably fastened between the spokes of a motor vehicle rim, has proven itself.

However, there is a need to provide such a decorative cover having active lighting, which is not yet known.

There are a number of publications that deal with the active lighting of motor vehicle tires, such as, for example, U.S. Pat. No. 4,775,919 A1, which describes a permanent magnet which can be rotated independently of the wheel rotation and which generates an induction voltage with respect to fixed induction coils, in such a way that a total of four energy-generating elements are arranged on the circumference of the motor vehicle rim. Such an arrangement, in which energy is generated by means of magnetic induction, is complex, requires large components and only achieves a relatively low energy yield because the centrifugal forces which otherwise exist and act on the outer circumference of the wheel are not exploited.

The subject matter of U.S. Pat. No. 4,782,431 A1 has disclosed a further energy generating device in which a magneto generator having a rotor is provided, said rotor being arranged coaxially with the wheel hub and therefore only offering a relatively low energy yield. It relies on vehicle-mounted counter surfaces, thereby increasing the installation effort.

U.S. Pat. No. 4,881,153 A1 describes two coaxially opposite conductive rings which are in rotating contact during the rotation of the wheel, whereby frictional electricity is generated which is used to illuminate a light element.

This arrangement is also limited to the coaxial arrangement on a motor vehicle wheel. The same disadvantage also applies to the subject matter of U.S. Pat. No. 4,893,877 A1, in which electrically conductive windings are arranged on the inside of the concentric installation, wherein a permanent magnet is opposite thereto. Here too, a suitable induction voltage is generated by magnetic flux and induction.

U.S. Pat. No. 4,929,030 A works with eccentrically arranged elements which are arranged coaxially to the axis of rotation of the motor vehicle rim, as a result of which there is only a low energy yield.

Some publications show generators based on the gyroscopic principle. In this case, a rotating gyroscope is arranged in the hub area of the rim, which relies on opposite counter-surfaces that are fixedly arranged in the vehicle. Here too, the installation effort and the susceptibility to faults are great.

The invention is therefore based on the object of developing a decorative cover of the type mentioned in such a way that active lighting is achieved with a high energy yield in the area of a decorative cover which is detachably fastened to the rim.

To achieve the object, the invention is characterized by a decorative cover for motor vehicle wheels, which is detachably arranged in the space between spokes of a motor vehicle rim, wherein the decorative cover has active lighting, the electrical energy of which can be generated by an energy module fastened to the rear of the decorative cover, and wherein the energy generation thereof works independently of the fixed components of the motor vehicle.

According to a preferred embodiment, it is provided that the decorative cover has active lighting, the electrical energy of which can be generated by an energy module fastened to the rear of the decorative cover, wherein the energy generation thereof works independently of the fixed components of the motor vehicle.

Another feature of the invention is that an approximately sector-shaped decorative cover has an illuminated light field and is detachably fastened in the space between the spokes of a motor vehicle rim, wherein the light field is fed by an autonomously working energy supply which is arranged on the rear of the decorative cover and essentially consists of a decorative cover-side energy module and consists of a light scattering element.

This has the advantage that self-sufficient light generation is possible in a separate sector-shaped decorative cover, because all the elements required for energy generation and light emission are arranged in the decorative cover and because this decorative cover designed as an autonomously working element is detachably fastened to the spokes in the space between said spokes and can thus also be removed again from the spokes. All the means for generating energy are arranged in the decorative cover and no further components are required on the non-rotating parts of the motor vehicle in order to generate energy. A number of self-sufficient decorative covers are thus releasably arranged the outer circumference of the rim, which result in a wheel cap-like decorative cover.

The term "autonomously working element" therefore means that the energy module has a generator that works independently of the fixed components of the motor vehicle (autonomously). In the prior art, it is necessary to provide induction coils or other components on the non-rotating side of the motor vehicle, for example in the area of the hub, which is omitted in the invention.

A light generator built in the decorative cover can, for example, consist of one or more LED elements, and there is the further advantage that the light generated by the LED elements is directed to a light-conducting scattering element, which allows a large-area light distribution over the decorative cover, in such a way that there is the possibility to emit the light both alone on the front of the decorative cover and on the rear of the decorative cover, such that in this case the back of the motor vehicle rim can also be illuminated.

In a first preferred embodiment of the invention, the installation in the decorative cover essentially consists of an energy module which controls one or more light elements, which in turn controls a scattering element which supplies a front-side luminous area with light, said luminous area visibly emitting the light generated to the outside.

In a preferred embodiment of the invention, a generator is arranged in the interior of the energy module, which is used to generate electricity, and a sensor, which is preferably connected by means of a contactless communication link to a control module in the motor vehicle, which itself is connected to the control unit of the motor vehicle.

There is a wireless communication link between the control module adjacent to the motor vehicle and the sensor adjacent to the decorative cover, and there are various options:
1. The energy supply to the energy module on the decorative cover can be provided solely by means of the communication link between the control module adjacent to the motor vehicle and the sensor in the decorative cover.
2. The energy is generated autonomously in the energy module inside the decorative panel.
3. There is a combination between points 1 and 2.

Because, according to the invention, the decorative cover is arranged off-center of the axis of rotation of the motor vehicle rim, there is now the possibility that highly effective energy generation with suitable generators is possible during the wheel rotation due to the high centrifugal forces acting radially outward.

Because of the centrifugal forces acting there, it is possible, for example, to use a weight pendulum or a pressure pendulum which can be moved radially under the action of the centrifugal force and which is used to generate energy, for example by means of the piezoelectric effect.

Such energy generation can take place, for example, in that the weight-loaded pendulum acting as a one-armed lever arm strikes against assigned opposite generator surfaces when accelerating or braking the vehicle and generates voltage peaks there by means of the piezoelectric effect, which are picked up by the generator and temporarily stored in a battery.

A further possibility relates to a pressure ram which is displaceably guided in the radial direction of the rim and which, under the action of the centrifugal force, can be displaced against a radially outward pressure surface which is designed as a piezoelectric contact surface.

A third embodiment of the generator uses the so-called drive-electric effect, in which a mass, under the influence of centrifugal force, also rubs against an electrical sensor surface and generates energy, which is absorbed by the generator and is temporarily stored in the connected battery.

There are no restrictions on the design of the generator in the invention; three different exemplary embodiments are therefore only mentioned as examples within the scope of the present invention. Other methods of energy generation are also claimed.

It is therefore advantageous in the invention that the decorative cover is arranged off-center of the axis of rotation of the motor vehicle rim in the radial outer area of the spokes and that the centrifugal forces acting there can be used for highly effective energy generation, which was not previously known.

All previously described documents assume that the energy is generated coaxially in the area of the axis of rotation of the motor vehicle rim, as a result of which the energy yield is low.

The subject matter of the present invention results not only from the subject matter of the individual claims, but also from the combination of the individual claims with one another.

All of the information and features disclosed in the documents, including the summary, in particular the spatial configuration shown in the drawings, could be claimed as essential to the invention, insofar as they are new compared to the prior art, individually or in combination. The use of the terms "essential" or "according to the invention" or "essential to the invention" is subjective and does not imply that the features named in this way must necessarily be part of one or more claims.

In the following, the invention will be explained in more detail with reference to drawings that show only one embodiment. Further features and advantages of the invention which are essential to the invention emerge from the drawings and their description.

Figure 7:
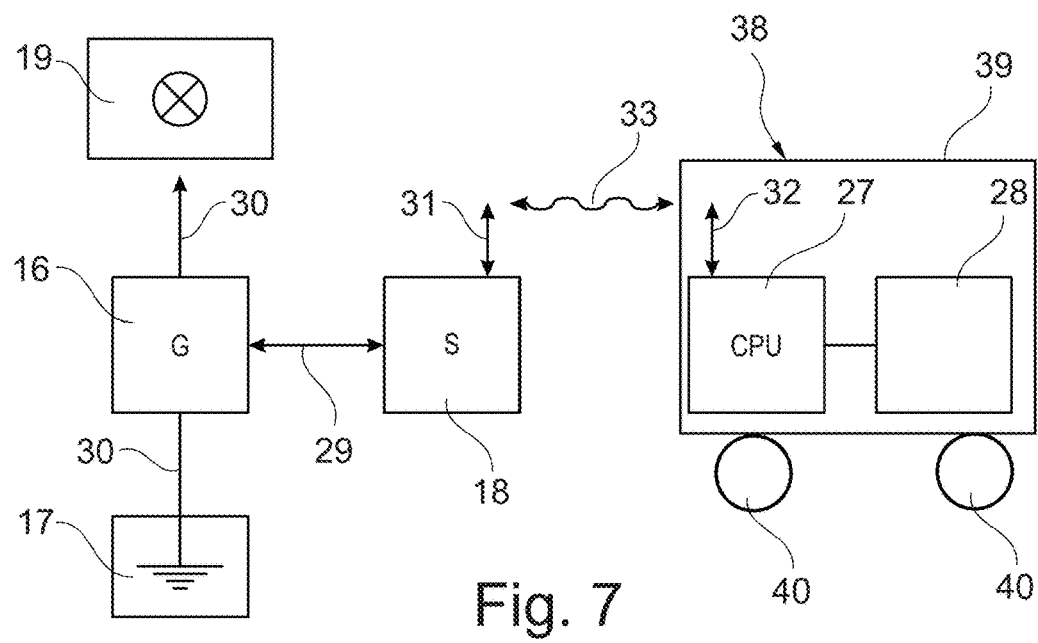
Figure 8:
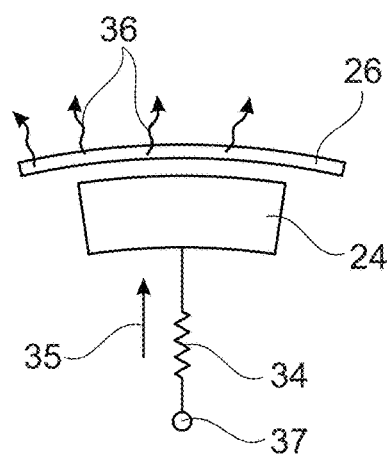

FIG. 7 schematically shows a block diagram of the circuit of the decorative panel having active lighting in connection with the communication modules adjacent to the motor vehicle;

FIG. 8 is a schematic representation of the energy generation by means of centrifugal forces.

Figure 1:
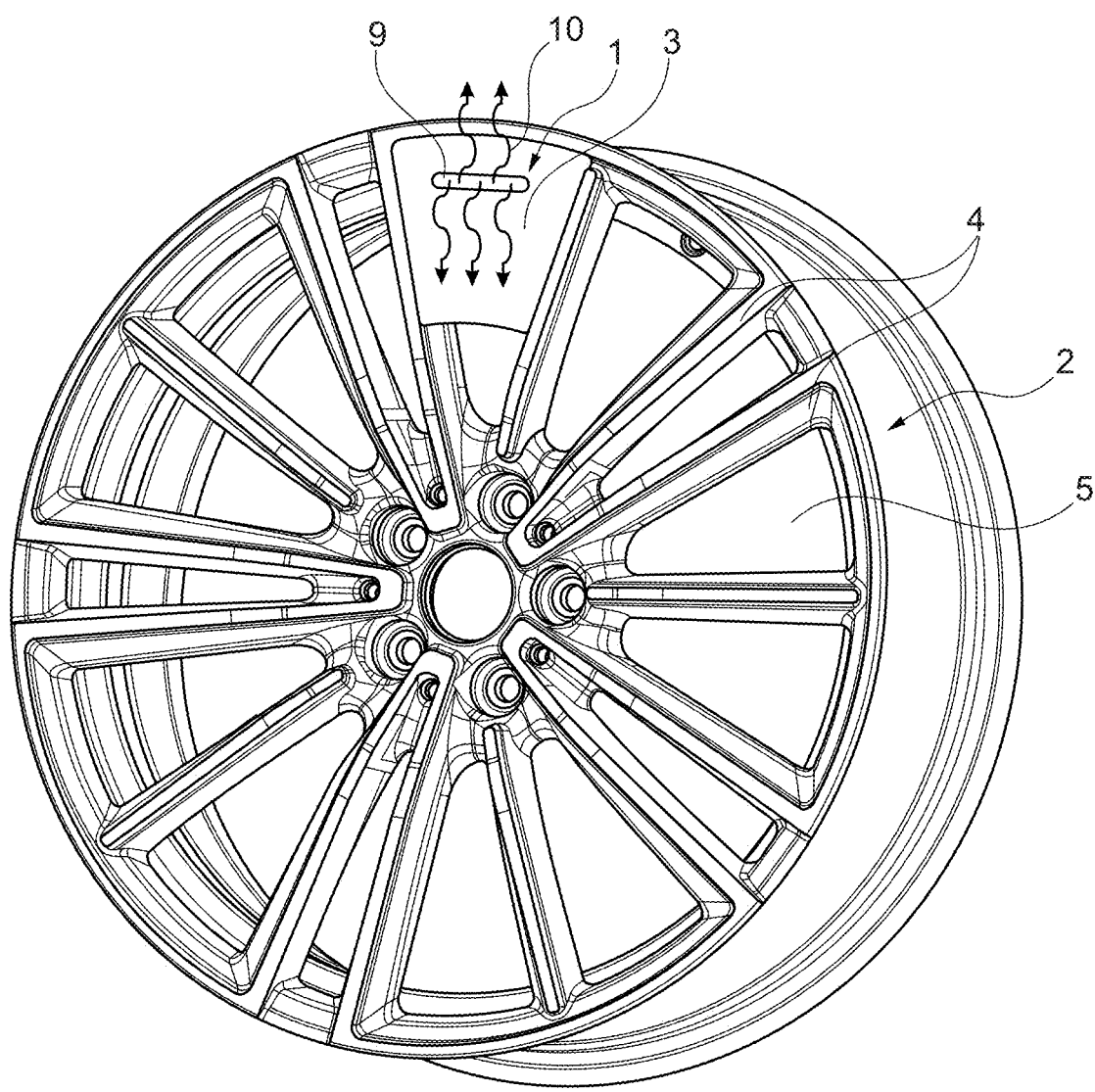
FIG. 1 shows a perspective view of a motor vehicle rim having a built-in decorative cover with active lighting.

FIG. 1 schematically shows a decorative cover 1, which is approximately sector-shaped and has a luminous area 9 on the front side 3, via which light beams 10 are emitted to the front (perpendicular to the plane of the decorative cover).

Figure 2:
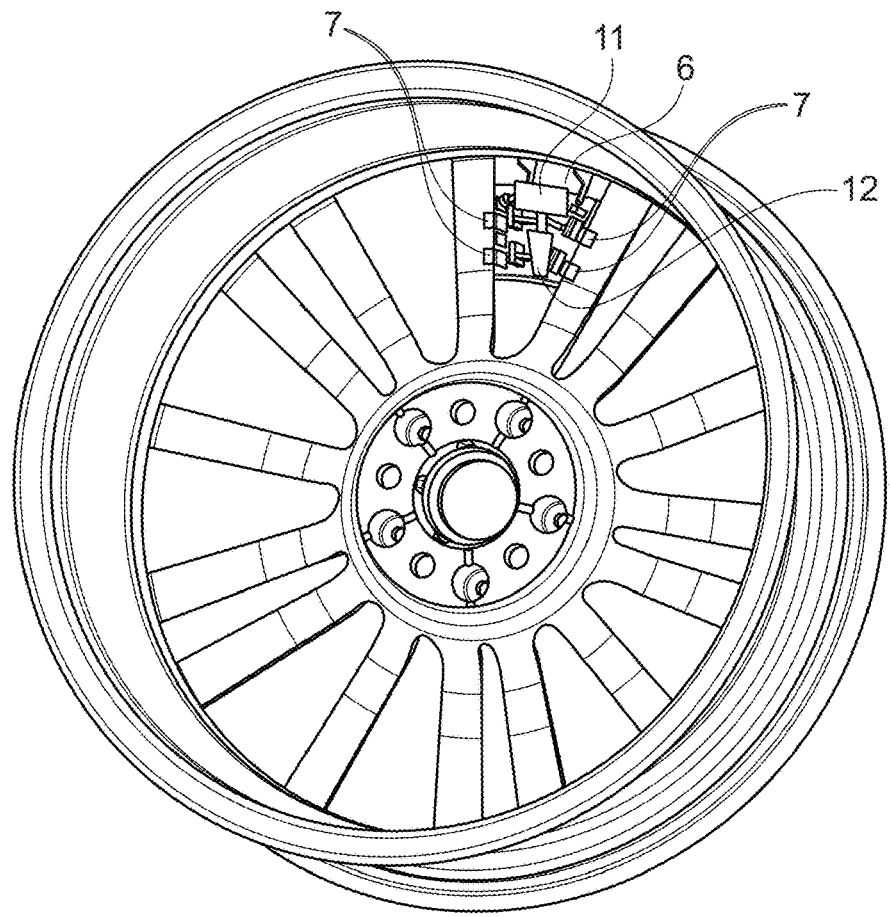
FIG. 2 shows the rear view of the arrangement of FIG. 1.

The decorative cover 1 is releasably clamped in the space 5 between spokes 4 of the motor vehicle rim 2, wherein FIG. 2 shows that this releasable connection is made with the aid of clamping elements 7, which are displaceable and lockable in the arrow directions 13 and which are clamped with flaps (not shown in detail) behind the respective spoke 4 and thus hold the decorative cover 1 in the assembly position shown in FIG. 2.

Figure 3:
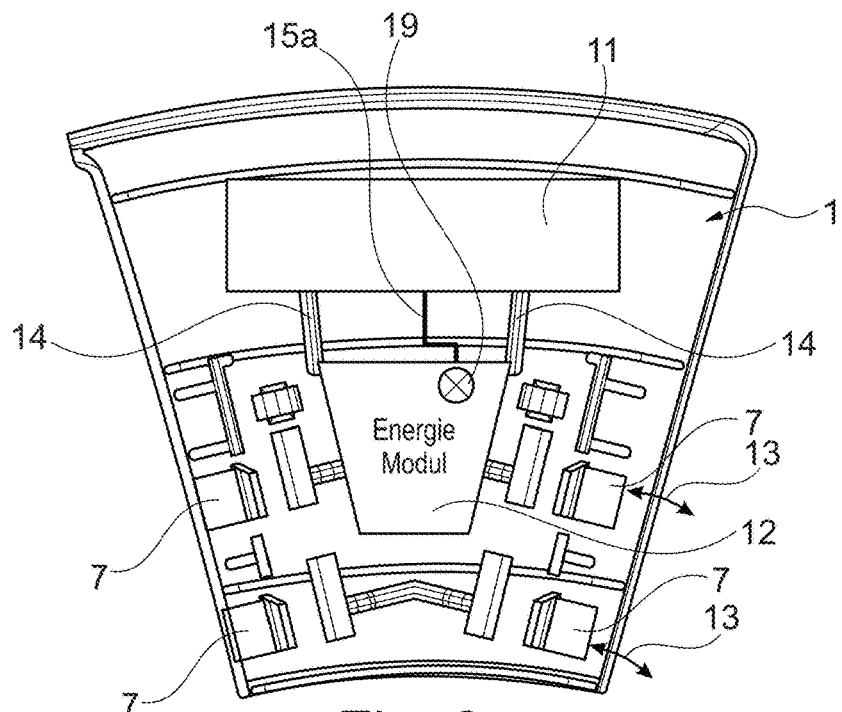
FIG. 3 is an enlarged representation of the rear view of the decorative panel.
Figure 4:
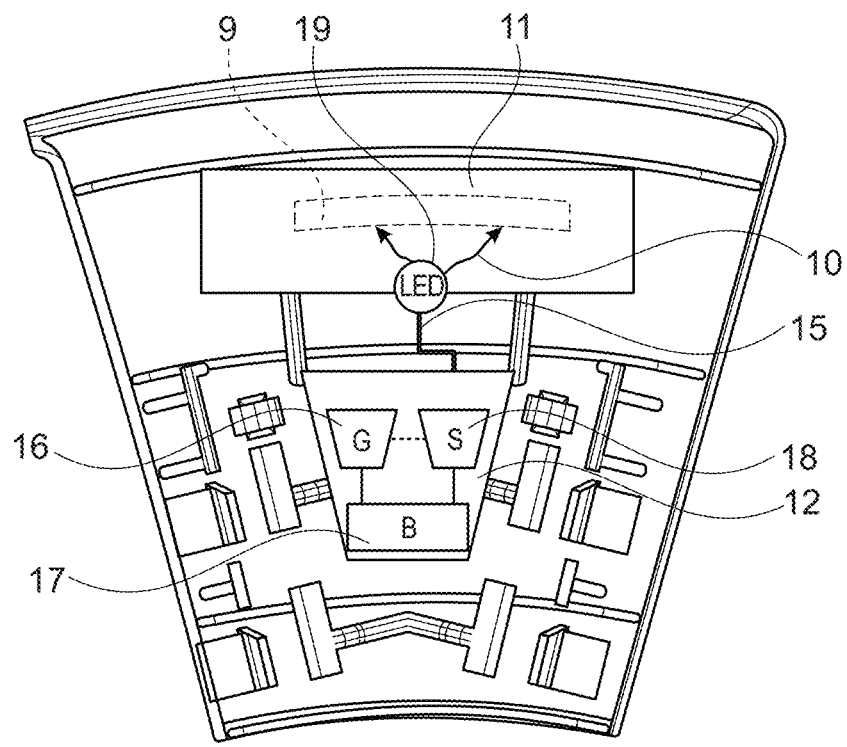
FIG. 4 shows a modified version compared to FIG. 3.
Figure 5:
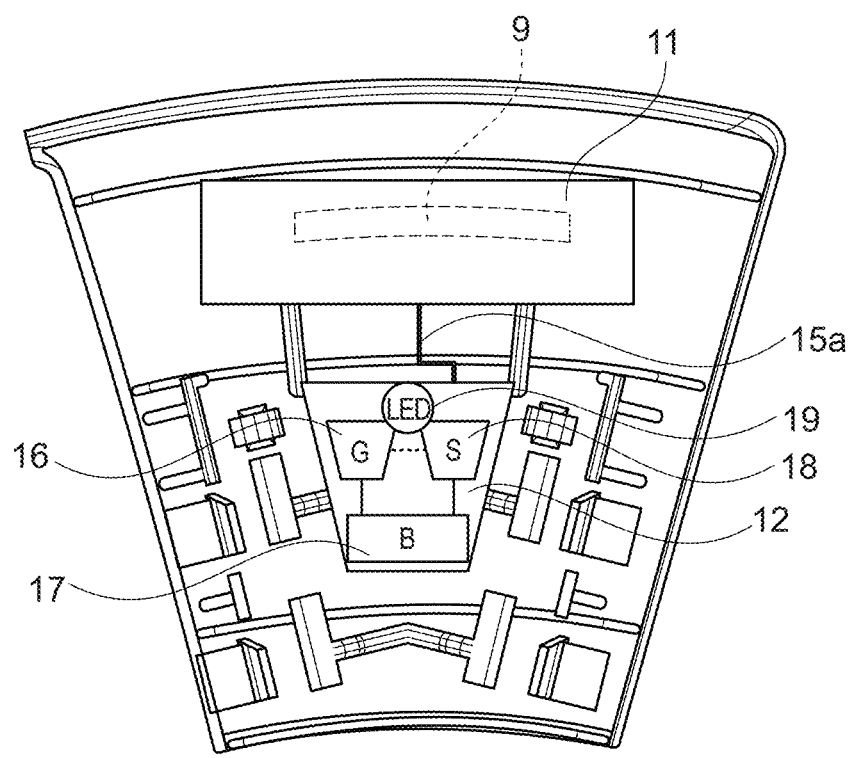
FIG. 5 shows a modified version compared to FIG. 4.

In the interior of the decorative cover 1, there is essentially an electronic circuit board 8 which, according to FIGS. 3 to 5, consists of a light-absorbing scattering element 11, into which the light is received by one or more light elements 19 which, for example, are designed as LEDs.

In the exemplary embodiment shown in FIG. 3, the light element 19 is arranged in the energy module 12 and guides the light via a light guide 15 a into the scattering element 11, which is illuminated over the entire area by light scattering.

Thus, in a first embodiment, it can be provided that the entire front side 3 of the decorative cover is designed as a light scattering element 11, and in a second embodiment it can be provided that the front side 3 of the decorative cover 1 is opaque as a whole and, according to FIG. 1, only one light-emitting, small-area luminous area 9 is pierced.

While the light element 19 is arranged in the energy module 12 in FIG. 3, FIG. 4 shows that the light element 19 can also be arranged directly in the scattering element 11 in a light-conducting manner, and it is shown as an alternative embodiment that the light beams 10 emanating from the light element 19 illuminate the luminous area 9.

As previously mentioned, the light beams 10 can also illuminate the entire diffusing element 11, as a result of which the luminous area 9 then extends over the entire diffusing element 11.

An energy-generating generator 16 is preferably provided in the interior of the energy module 12 and is in electrical connection with a sensor 18, the two elements being supplied with current by a battery 17.

The energy module 12 is anchored to the rear of the decorative cover 1 with the aid of suitable holders 14 (see FIG. 3).

FIG. 4 shows that the current generated by the energy module is passed on to the light element 19 via a cable 15.

In an alternative embodiment compared to FIG. 4, FIG. 5 shows that the light element 19 can be arranged in the energy module 12 and that the light generated by the light element 19 is guided in a light-conducting manner onto the scattering element 11 by means of a light guide 15a.

Figure 6:
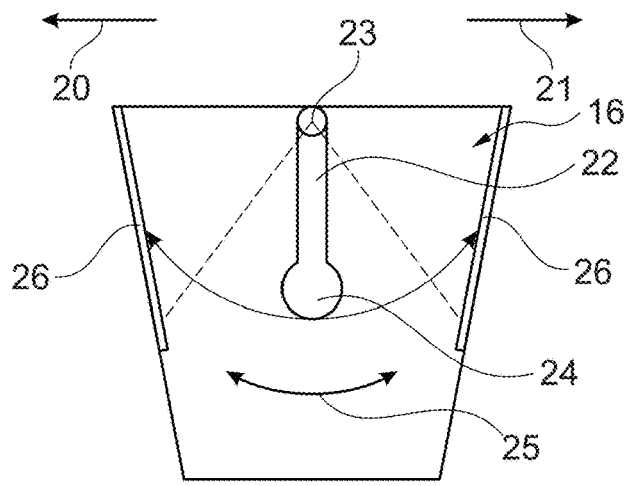
FIG. 6 shows a first exemplary embodiment of an energy generating generator based on the piezoelectric effect.

FIG. 6 shows, as the first exemplary embodiment, a generator 16 which works according to the piezoelectric effect, wherein a single-armed pendulum 22 is pivotably fastened to a pivot bearing 23 which is located radially to the outside of the motor vehicle rim 2 and can deflect in the arrow directions 25. The deflection in the respective arrow direction 25 takes place in accordance with the acceleration forces which arise in the forward direction 20 or the reverse direction 21 when the motor vehicle is traveling.

The resulting reaction forces lead to an oscillating deflection of the pendulum 22, in such a way that the weight 24 optionally strikes the surface of two opposing generator surfaces 26 with a relatively high impulse force and, as a result, a voltage peak is generated in the respective generator surface 26 after the piezoelectric effect is taken up by the other switching components of the generator 16 and is temporarily stored in the battery 17.

Accordingly, FIG. 7 shows a preferred circuit of such an active illumination of the decorative cover in the context of a motor vehicle installation.

The parts shown only as a block diagram relate to the generator 16, which is connected to the light element 19 by means of a conduit 29 and to the battery 17 by means of a further conduit 30.

The sensor 18 is connected by means of a wireless communication link 33 (see the antennas 31, 32) to a control module 27 on the motor vehicle 38. The motor vehicle 38 includes wheels 40 and non-rotating components 39. The control module 27 is in turn connected to the motor vehicle control unit 28.

In this way, switching or control commands can be given to the sensor 18 via the wireless communication link 33 by means of the motor vehicle control unit, in such a way that either energy transfer takes place or the generator 16 is switched on or off or other control operations are carried out in the circuit on the decorative cover such as a change in light color, a change in light intensity, a change in light frequency and the like.

With the given technical teaching, there is the advantage that an autonomously working and removable decorative cover 1 is created, which is easy to install and remove and which provides for self-sufficient energy generation without being connected to the motor vehicle energy supply. There is also no need for any built-in components on the vehicle that work together with the illuminated decorative cover.

Due to the radially outward fastening of the decorative cover 1, the high centrifugal forces which arise during driving operation act on the generator 16, which, owing to these centrifugal forces, shows an essentially higher energy yield than, in comparison, a hub-side energy generation.

FIG. 8 shows, as a further example, such energy generation by means of centrifugal forces, where in the vicinity of the hub there is a bearing 37 for a weight 24 which can be deflected in the centrifugal direction and which is held in a certain retracted position by means of a spring 34.

There are no further construction details, such as, for example, longitudinal guides, which ensure that the weight 24 is always guided longitudinally only in the centrifugal direction, namely in the arrow direction 35.

When a centrifugal force acts, the spring is thus stretched and the weight 24 is pressed in the arrow direction 35 against the inside of the piezoelectric generator surface 26, and this results in voltage peaks 36 which are picked up by the generator-side circuit and converted into associated, suitable currents.

According to FIG. 8, it is possible to generate energy using the triboelectric effect in that the weight 24 is frictionally pressed against a generator surface 26 designed as a friction surface under the action of the centrifugal force, as a result of which electrical voltage pulses are generated in the generator surface 26, which are processed in a suitable circuit and stored in the battery 17.

REFERENCE NUMERALS 1 decorative cover
2 motor vehicle rim
3 front (of 1)
4 spoke
5 space (between 4)
6 rear (of 1)
7 clamping elements
8 electronic circuit board
9 luminous area
10 light beams
11 scattering element
12 energy module
13 arrow direction
14 holder
15 cable 15a light conductor
16 generator
17 battery
18 sensor
19 light element
20 forward direction
21 reverse direction
22 pendulum
23 pivot bearing
24 weight
25 arrow direction
26 surface area
27 control module
28 control unit
29 conduit
30 conduit
31 antenna
32 antenna
33 communication link
34 spring
35 arrow direction
36 voltage peak
37 bearing
38 motor vehicle
39 non-rotating components
40 wheels

The invention claimed is:

1. A decorative cover for motor vehicle wheels, the decorative cover being detachably arranged in a space between spokes of a rim of a motor vehicle in a radially outward position on the rim, the decorative cover comprising:
at least one light element for providing active lighting,
an energy module comprising a generator for generating electrical energy for the at least one light element using centrifugal forces generated during a driving operation of the motor vehicle,
wherein the energy module is fastened to a rear of the decorative cover and provides the electrical energy from the centrifugal forces to the at least one light element autonomously and independently of non-rotating components of the motor vehicle.

2. The decorative cover according to claim 1, further comprising a plate-shaped diffusing element arranged in the decorative cover, and wherein the light of the at least one light element acts on the plate-shaped diffusing element.

3. The decorative cover according to claim 1, further comprising a sensor arranged in the energy module in electrical connection with the generator, and a power-storing battery arranged in the energy module and electrically connected to the generator and the sensor.

4. The decorative cover according to claim 3, further comprising a contactless communication link for providing communication between the sensor and electronic modules of the motor vehicle.

5. The decorative cover according to claim 1, wherein the non-rotating components include the energy module, and the energy module is configured to generate energy independently.

6. The decorative cover according to claim 1, further comprising:
   a control module arranged in the motor vehicle;
   a sensor arranged in the energy module; and
   a communication link connected between the control module and the sensor configured to supply communications between the control module and the energy module adjacent to the decorative cover.

7. The decorative cover according to claim 1, further comprising a weight arranged in the generator that is configured to use centrifugal force acting on the weight to generate energy.

8. The decorative cover according to claim 1, wherein the at least one light element is arranged inside or outside the energy module.

9. The decorative cover according to claim 1, further comprising a battery, and a communication link connected between the battery and the generator to supply power to the energy module.

* * * * *